Figure 1:
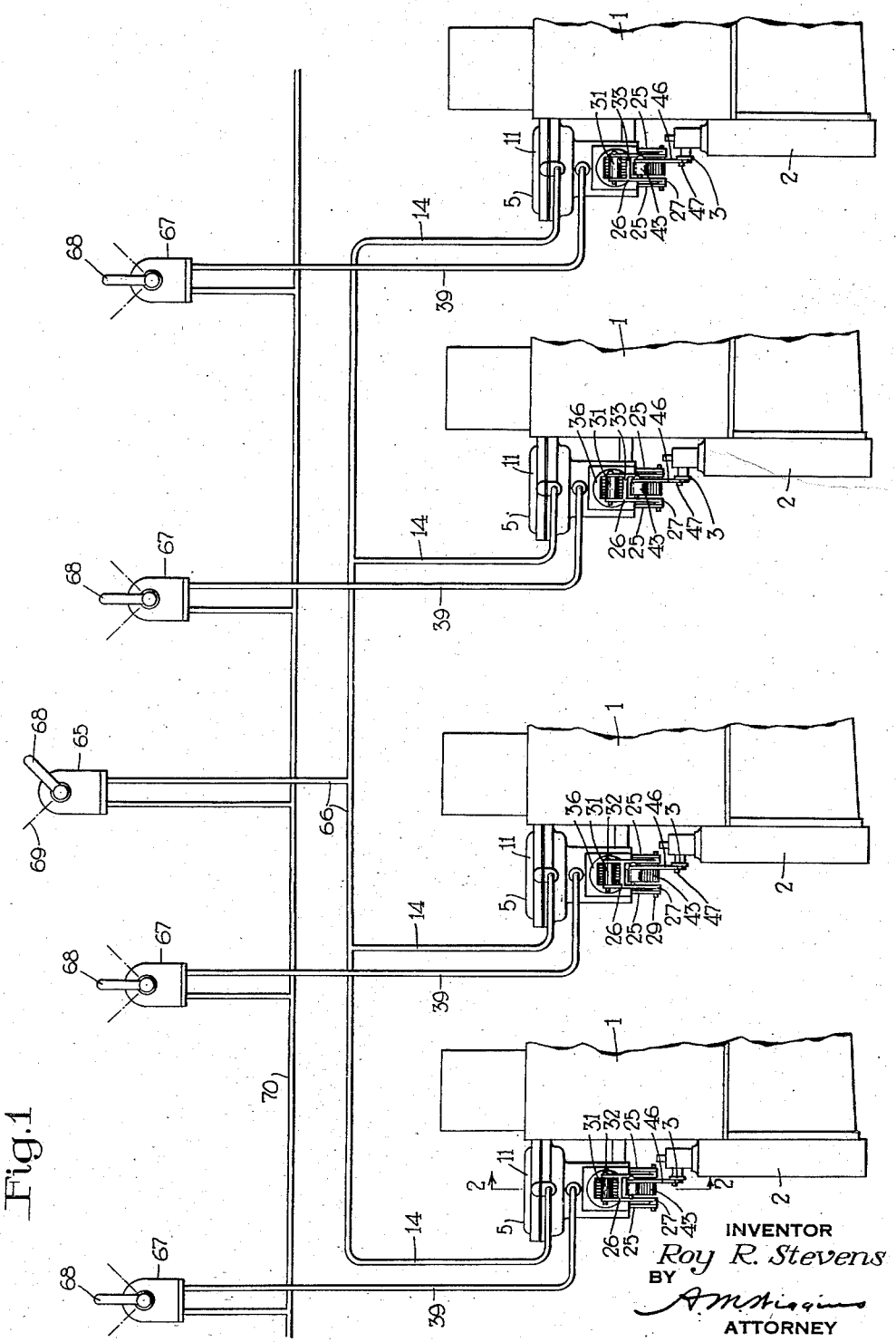

Aug. 21, 1945.  R. R. STEVENS  2,383,277
CONTROL APPARATUS
Filed May 27, 1942    2 Sheets-Sheet 2

INVENTOR
Roy R. Stevens
BY
ATTORNEY

Patented Aug. 21, 1945

2,383,277

UNITED STATES PATENT OFFICE 2,383,277

CONTROL APPARATUS

Roy R. Stevens, Forest Hills, Pa., assignor to The Westinghouse Air Brake Company, Wilmerding, Pa., a corporation of Pennsylvania Application May 27, 1942, Serial No. 444,742

8 Claims. (Cl. 60—97)

This invention relates to control apparatus and more particularly to means for controlling the positioning or conditioning of a plurality of devices, such as engine throttles or fuel control devices.

In certain water craft a plurality of internal combustion engines of the Diesel type are all connected together for driving a single propeller and when all of the engines are operating it is desirable to equalize the torque load of the propeller between the several engines.

One object of the invention is therefore the provision of improved means for accomplishing this result.

Another object of the invention is the provision of pneumatic control arrangements embodying a single control valve adjustable manually to provide synchronous operation of a plurality of prime movers such as Diesel engines.

Another object of the invention is the provision of control arrangements for a plurality of engines embodying means adjustable by fluid pressure for governing the speed of each engine and a manually operative control valve for governing the pressure of fluid controlling each of said means to thereby provide synchronous operation of the several engines.

It is also desirable that the speed or output of each of the several engines be individually adjustable in order to compensate for inaccuracies in manufacture or in adjustment of devices such as fuel pumps or other governing means. Moreover, the condition of an engine may be such that its output for a certain speed may be different from that of the other engines, or in use it may be found that one engine is operating under a greater load or at a higher temperature than the others. Individual adjustments of each engine is therefore desirable in order to equalize the load between the engines or to compensate for some abnormal condition such as just described.

Another object of the invention is therefore the provision of control arrangements for a plurality of engines which provides for individual adjustments of each engine to compensate for conditions such as just set forth.

A further object of the invention is the provision of control arrangements for a plurality of engines embodying a primary or master controller for simultaneously adjusting, regulating, or synchronizing the speed or output of the several engines and further embodying for each engine a secondary or vernier controller arranged to modify the adjustment effected by the master controller to compensate for any variable condition such as above described or for any other desired reason.

Another object of the invention is the provision of an arrangement as defined in any of the above objects providing for pneumatic control of all engines simultaneously and of each engine individually from a remote control station.

Another object of the invention is the provision of novel means operative by fluid under pressure to adjust the speed or output of an internal combustion engine in accordance with the pressure of such fluid.

Other objects and advantages will be apparent from the following more detailed description of the invention.

Figure 2:
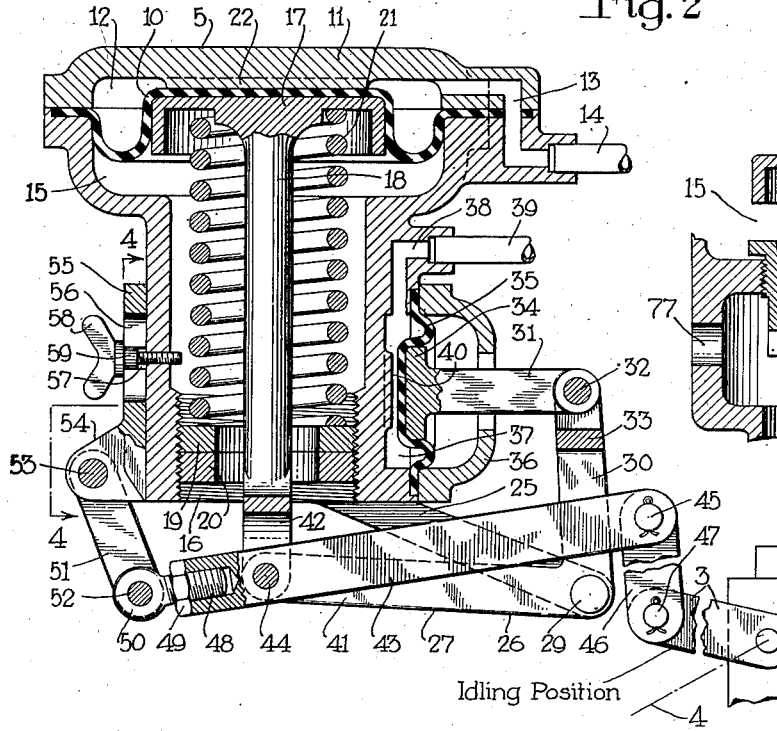
Figure 5:
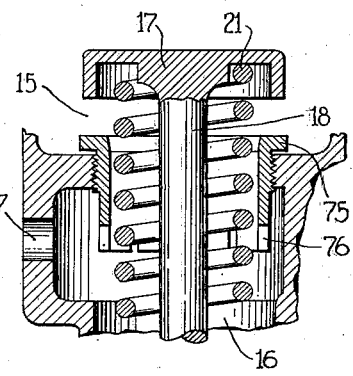
Figure 3:
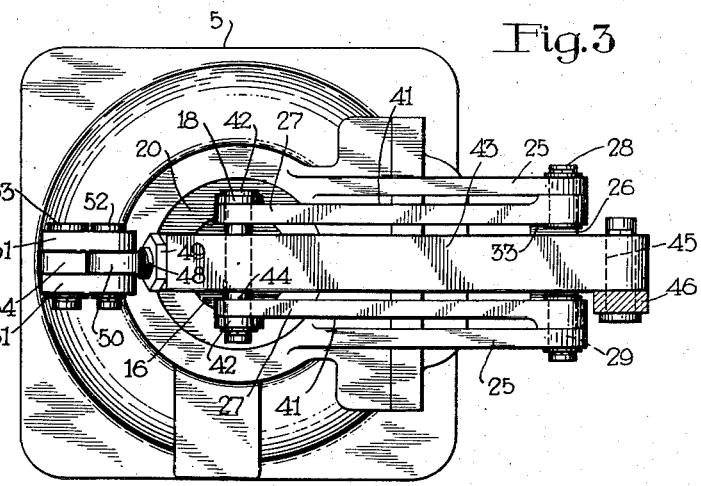
Figure 4:
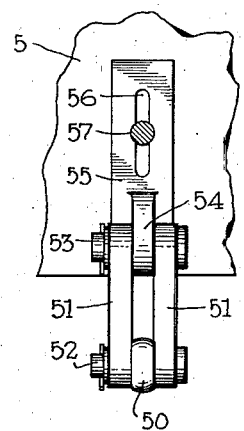

In the accompanying drawings; Fig. 1 is a diagrammatic view of an engine control system embodying the invention; Fig. 2 is a sectional view of a pneumatic control device associated with each of the engines shown in Fig. 1 and taken on the line 2—2 in Fig. 1; Fig. 3 is a bottom plan view of the pneumatic control device shown in Fig. 2; Fig. 4 is a sectional view taken on the line 4—4 in Fig. 2; and Fig. 5 is a sectional view, similar to a portion of Fig. 1, of a modification of the invention.

*Description.*—Figs. 1 to 4

In Fig. 1 of the drawings the reference numerals 1 indicate a part of each of four internal combustion engines of the Diesel type all of which may be connected to one propeller (not shown) of a water craft in any conventional manner. Each engine 1 is provided with a fuel supply device 2 of any desired structure which is adjustable by a rocker arm 3 to vary the amount of fuel supplied to the engine. Accordingly, each arm 3 may have an engine idling position in which it is shown in Figs. 1 and 2 and which provides for idling operation of the engine. Each arm 3 may be rockable from the idling position in the direction of a dotted line 4 (Fig. 2) to provide for increased speed or output of the engine according to the extent of such movement. The dotted line 4 indicates the maximum degree of movement of arm 3 from idling position and therefore the position which provides for maximum engine speed or output.

The engines 1, fuel supply devices 2, and the throttle control arms 3, therefore, are well known to those skilled in the art and in the present application merely constitute a means for illustrating one use of the invention. In view of these facts a more detailed showing of these parts in the drawings and description thereof are not deemed essential to a clear and comprehensive understanding of the invention, which will now be described.

According to the invention, a pneumatic control device 5, which will hereinafter be termed a throttle control device is mounted on each engine above the fuel supply device 2 and is provided for adjusting the arm 3 to cause operation of said engine at a speed proportional to the pressure of fluid supplied to control said device, as will be hereinafter described.

Each throttle control device 5 comprises a casing carrying at one end a master control movable abutment 10 which is preferably in the form of a flexible diaphragm clamp around its periphery between one end of the casing and a cover 11 secured thereto. Between the cover 11 and diaphragm 10 is a pressure chamber 12 which is connected, by a passage 13 extending through the cover and casing, to a fluid pressure control pipe 14 connected to the casing. At the opposite side of the diaphragm is a non-pressure chamber 15 which is open to a bore 16 extending through the casing to the opposite end thereof. The device is preferably arranged with the diaphragm at the top and with the bore 16 opening through the lower end of the casing to minimize accumulations of foreign matter in said bore below the diaphragm 10.

A diaphragm follower 17 is disposed in the non-pressure chamber 15 with one side in contact with the lower face of the diaphragm 10 and is provided with an operating stem 18 depending from the opposite side and extending through the bore 16 to a point below the casing. A portion of the wall of bore 16 adjacent its lower end is provided with screw threads in which is mounted an adjusting nut 19 and a lock nut 20. These nuts are ring-shaped and are provided centrally with aligned apertures through which the follower stem 18 loosely extends. A coil control spring 21 encircling the stem 18 bears at one end against the adjusting nut 19 and at the opposite end against the follower 17.

When chamber 12 is at atmospheric pressure the spring 21 is operative to bias or hold the diaphragm 10 in contact with a stop 22 provided on cover 11. When fluid under pressure is supplied to chamber 10 by way of pipe 14, as will be later described, the diaphragm 10, follower 17 and stem 18 will move against the opposing pressure of the spring 21 to a position in which the force of the spring and another force also to be later described, balances the pressure of fluid on the diaphragm. In other words, the spring 21 is operative to define positions of diaphragm 10 and stem 18 corresponding to the pressure of fluid supplied to chamber 12 to act on the diaphragm.

It is desirable that the diaphragms 10 in the several throttle control devices 5 operate in unison in response to simultaneous variations in fluid pressures in chambers 12 in order to provide as nearly as possible synchronous operation of the several engines 1. It is however understood that in the manufacture of springs like spring 21 there may be slight variations in dimensions such as free height and there may even be slight variations in the material from which such springs are made so that it is substantially impossible to attain a plurality of springs exactly alike in all respects. To off-set such variations the adjusting nut 19 is provided in the control devices 5 whereby the pressure of the springs 21 on the diaphragms 10 may be adjusted relative to each other so as to obtain substantially synchronous movement of said diaphragms in the several control devices 5 when fluid under pressure is simultaneously supplied to or released from the pressure chambers 12 in said devices. The lock nut 20 is provided in each control device 5 for locking the adjusting nut 19 in an adjusted position.

Projecting diagonally downwardly from the lower end of the casing of each throttle control device 5 are two parallel arms 25 which are spaced apart. A bell crank 26 comprising two like parallel arranged and space apart bell crank elements 27 is disposed with the knees of said elements between the ends of the arms 25. A pin 28 pivotally connects the knee of one bell crank element 27 to one of the arms 25 while a pin 29 pivotally connects the knee of the other crank element 27 to the other arm 25, the two pins 28 and 29 constituting two axially aligned fixed fulcrums for the bell crank 26.

At one side of the fulcrum pins 28 and 29 each of the bell crank elements 27 has a relatively short lever arm 30 projecting in a generally vertical direction along one side of the casing. The two arms 30 are spaced apart to receive between their ends the end of a diaphragm follower stem 31 to which they are pivotally connected by a pin 32. The two arms 30 may be rigidly connected together back of the ends thereof by an integrally formed bridge 33.

The other end of the diaphragm stem 31 is connected to a diaphragm follower 34 which engages one side of a flexible vernier diaphragm 35. This diaphragm and the follower 34 and follower stem 31 are arranged with their axes substantially at right angles to the axis of the diaphragm 10, and the diaphragm 35 is clamped to the casing around its periphery by a cover 36. The cover 36 has an opening through which the follower stem 31 loosely extends and through which the adjacent face of the diaphragm is constantly subject to atmospheric pressure. At the opposite side of the diaphragm 35 is a pressure chamber 37 which is connected by a passage 38 to a fluid pressure control pipe 39. Extending from the casing into the pressure chamber 37 is a stop 40 for engagement by the diaphragm 35 to limit deflection thereof in one direction.

Each of the bell crank elements 27 has a relatively long lever arm 41 extending in a generally horizontal direction and thus substantially at right angles to the lever arms 30 and to the axes of diaphragm 10 and stem 18 and terminating below the casing between the opposite sides of a jaw 42 provided on the end of the follower stem 18. A throttle control lever 43 disposed for operation between the two portions 27 of the bell crank 26 extends through jaw 42 between the lever arms 41, and a fulcrum pin 44 extends through the throttle lever, the ends of said jaw and the ends of the lever arms 41 thereby pivotally connecting these parts together.

One end of the lever 43 is disposed beyond bell crank lever arms 30 and is pivotally connected by a pin 45 to one end of a link 46, the opposite end of which link is connected by a pin 47 to the end of the throttle control arm 3.

An adjusting bolt 48 has one end screwed into the opposite end of lever 43 and is locked in position by a lock nut 49. The other end of the adjusting bolt has an eye portion 50 disposed between two parallel arranged links 51, and a pin 52 extends through the links and said eye for pivotally connecting these parts together. The opposite ends of links 51 are pivotally connected by the pin 53 to an ear 54 provided on a plate 55 which is mounted against one side of the casing.

The plate 55 has a slot 56 and intermediate the ends of the slot a bore 57 of greater diameter than the width of the slot. A thumbscrew 58 having screw-threaded engagement with the casing is provided with a cylindrical portion 59 adapted to fit and enter the bore 57 for defining a normal position for the plate 55; said screw when tightened against said plate being arranged to rigidly secure the plate to said casing in said position. When the screw 58 is backed out of the casing to a position in which the cylindrical portion 59 is withdrawn from bore 57, the plate is capable of adjustment in either direction and may be secured in an adjusted position by turning screw 58 into the casing and thereby tightening the cylindrical portion against the outer face of the plate. Except in case of emergency, which will be later brought out, this plate is locked by the thumb screw in the normal position shown in the drawings to thereby provide, through the medium of links 51, a floating fulcrum for one end of the throttle control lever 43.

In practice, the chamber 37 at one side of the vernier diaphragm 35 in each throttle control device 5 is preferably charged with fluid at a pressure intermediate atmospheric pressure and a certain maximum degree which it is desired to use, and this pressure acting on the diaphragm 35 is applied through bell crank 26 to fulcrum pin 44 for the throttle control lever 43 in opposition to pressure of fluid applied to the master diaphragm 10 in chamber 12. With the chamber 12 at or substantially at atmospheric pressure, the force from diaphragm 35 plus the adjusted pressure of spring 21 on the diaphragm 10 will therefore maintain the diaphragm 10, stem 18, throttle control lever 43 and thereby the arm 3 of the fuel supply device 2 in the engine idling position shown in Fig. 2.

For operating an engine 1 at a speed greater than idling, fluid under pressure is supplied to chamber 12 and this pressure acting on the diaphragm 10 creates an actuating force for moving said diaphragm downwardly against the opposing force of spring 21 and of fluid on the diaphragm 35 to a position in which such opposing force is increased to a degree, by the pick-up of said spring, equal to said actuating force. This movement of the master diaphragm 10 acts through follower pin 44 to turn the lever 43 in a downwardly direction about its fulcrum with pin 52 to thereby move, through the medium of link 46, the throttle control arm 3 to a position corresponding to the position of diaphragm 10 or to the pressure of fluid acting on the diaphragm 10, and in which the engine 1 will be caused to operate at a correspondingly increased speed. An increase in the pressure of fluid in chamber 12 will effect movement of lever 43 and thereby of arm 3 further in the direction of full speed position of said arm to cause a corresponding further increase in speed of the engine, while a reduction in the pressure of fluid in chamber 12 will result in a corresponding reduction in engine speed. It will thus be seen that any pressure of fluid provided in the master diaphragm chamber 12 between atmospheric pressure and a certain maximum degree will cause a corresponding adjustment of the throttle control lever 43 and arm 3 and thus of the speed of the respective engine 1.

It will now be apparent that with the spring 21 in each control device 5 adjusted by nut 19 into contact with the respective follower 17 when the diaphragm 10 is in contact with its stop 22, the diaphragms 10 in the several control devices 5 will move in unison to provide synchronous adjustment of the arms 3 upon simultaneous supply of fluid at the same pressure to chamber 12 in the several control devices.

The fuel supply arm 3 has a certain definite movement between idling position and the position indicated by line 4 in Fig. 2 which latter position provides for operation of the engine at maximum speed or output. When synchronous operation of several engines is desired to be attained from a single master controller, to be later described, it is therefore necessary that, when the pressure of fluid in chamber 12 on the master diaphragm 10 of the several throttle control devices 5 is substantially that of the atmosphere, the throttle control levers 43 and arms 3 be in their idling position. When the maximum degree of fluid pressure is provided in chamber 12 of the several throttle control devices 5 it is likewise necessary that each of the throttle control levers 43 and arms 3 occupy the position indicated by line 4 providing for maximum engine speed, and for any lesser degree of fluid pressure in chambers 12 the throttle control levers 43 and arms 3 should be correspondingly positioned. In other words, each of the throttle control device 5 should respond to a certain fluid pressure supplied to chamber 12 to provide the same positioning of arm 3 as provided in all other control devices 5.

It will be seen from the above description that the position of the arm 3 and lever 43 in each control device 5 is dependent upon the position to which the diaphragm 10 is deflected by pressure of fluid supplied to act in chamber 12. Now for a certain degree of fluid pressure in chamber 12 the diaphragm 10 in one of the throttle control devices 5 may move to a certain position while in another control device it may move to a different position depending upon the pick-up characteristic, or the increase in pressure for a certain given deflection, of the different control springs 21. In other words, in one device the increase in pressure in spring 21 for a certain degree of deflection may be greater than in another device and as a result the degree of movement of the diaphragm 10 under a certain pressure of fluid in chamber 12 may be less in the one control device than in the other control device. It is however essential that, regardless of variations in this characteristic of the springs 21 employed in the several throttle control devices, the arms 3 should all be positioned the same for the same degree of fluid pressure in the diaphragm chambers 12, and this is attainable by screwing the adjusting bolts 48 either into or out of the throttle control levers 43 to thereby vary the distance between the fulcrum pins 44 and 52.

If the distance between the fulcrum pins 44 and 52 is reduced, a greater degree of movement of the opposite end of the throttle control lever 43 and thereby of arm 3 will be attained for a certain movement of the master diaphragm 10, while an increase in this distance will result in a reduction of the extent of movement of arm 3 for the same movement of the master diaphragm 10. By properly adjusting the bolt 48 in each of the several control devices 5, all of said devices may therefore be caused to operate to effect the same positioning of the throttle control arms 3 for the same degree of fluid pressure acting in the several chambers 12.

While synchronous and like adjustments of the several throttle control levers 43 and arms 3 are attainable upon simultaneous supply of the same degree of fluid pressure to chamber 12 of the several control devices, it might be found after such adjustments that one or another of the engines was not operating at the speed desired due possibly to improper adjustment of some part of the engine, inaccuracies of manufacture or the like, or it might even be observed that one engine was operating under a greater load or at a higher temperature than the others. As a consequence, it might be desired to change the speed of the individual engine or engines, the operation of which was abnormal without affecting in any way the adjustments or operation of the other engines. Such individual adjustment of the speed or output of any one engine is attainable by effecting a variation in the pressure of fluid in chamber 37 on the vernier diaphragm 35 of the respective control device 5, as will now be described.

If the speed of one engine is lower than desired, then in order to increase such speed, the pressure of fluid in chamber 37 on the vernier diaphragm 35 in the respective throttle control device 5 is reduced which results in a reduction in force applied through the bell crank 26 to pin 44 opposing the pressure of fluid on the master diaphragm 10. As a result, the pressure of fluid in chamber 12 on the master diaphragm is rendered effective to deflect said diaphragm in a downwardly direction to a new position in which it is stopped by the increase in pressure of spring 21 which corresponds to the reduction in fluid pressure on the vernier diaphragm 35, and this movement of the diaphragm 10 actuates the lever 43 and arm 3 to increase the speed or output of the respective engine in proportion to such reduction in fluid pressure on the diaphragm 35. A further reduction in the pressure of fluid on diaphragm 35 will effect a further and corresponding increase in speed or output of the engine.

On the other hand, an increase in the pressure of fluid in chamber 37 on the vernier diaphragm 35 will increase the force on pin 44 opposing the pressure of fluid on the master diaphragm 10 and thus move said diaphragm upwardly in the direction of its engine idling position to thereby reduce the speed or output of the engine a degree proportional to the increase in fluid pressure on the vernier diaphragm 35.

The speed of any one of the several engines may thus be changed or corrected from that initially provided for by the simultaneous operation of the several master diaphragms 10, by the proper increase or decrease in pressure on the respective vernier diaphragm 35.

Moreover, the vernier diaphragm 35 in each control device 5 provides for changing or correcting the speed of the respective engine with a great degree of accuracy due to the fact that the area of said diaphragm times the length of the bell crank lever arms 30 is only a small percentage of the area of the master diaphragm 10 times the length of the bell crank lever arms 41, such for instance as ten per cent, so that for a considerable variation in pressure on the vernier diaphragm 35 only a relatively small change in position of the throttle control lever 43 and arm 3 will occur with a correspondingly small change in engine speed.

The simultaneous control of the pressure of fluid in chamber 12 of the several control devices 5 may be attained by any suitable means such as a manually operable control valve 65 to which all of said chambers are connected by pipes 14 and a pipe 66. The pressure in each of the vernier diaphragm chambers 37 may be individually controlled by any suitable means such as manually operative control valve 67.

The control valves 65 and 67 may be of a structure similar to that disclosed in Patent No. 1,939,907 issued to E. K. Lynn on December 19, 1933, and which comprises a valve means conditionable by movement of a lever to supply fluid from a source to a receiver at a pressure dependent upon the extent of such movement from one end of a control zone of travel.

This lever is indicated in Fig. 1 by the reference numerals 68 and a source of fluid pressure for the several control valves 65 and 67 is indicated by a pipe 70. On the manually operative control valve 65 the lever 68 is shown at the end of its control zone which provides for substantially complete venting of fluid under pressure from pipes 66 and 14 and thereby from the several master diaphragm chambers 12. Movement of the lever 68 from this end of the zone in the direction of the opposite end will provide fluid in pipes 66 and 14 and thereby simultaneously in diaphragm chamber 12 of the several throttle control devices 5 at a pressure corresponding to the extent of such movement, and a maximum degree of pressure is attainable in such pipes and chambers when said lever occupies a position at the opposite end of the zone indicated by a line 69. To attain idling of the engines, the lever 68 in the manually operative control valve 65 must therefore occupy the position shown to provide for substantially the complete release of fluid under pressure from the pipes 66 and 14 and diaphragm chambers 12.

In each manually operative control valve 67 the lever 68 is normally carried in a position intermediate the ends of its zone of movement in order to provide in the respective diaphragm chamber 37 a pressure substantially intermediate atmospheric pressure and a maximum degree attainable by operation of said valve. Movement of the lever 68 in each manually operative control valve 67 in one direction from its intermediate position will therefore cause a reduction in pressure in the connected diaphragm chamber 37 while movement in the opposite direction will cause an increase in such pressure to thereby provide for the vernier adjustments of engine speed hereinbefore described.

As above mentioned the plate 55 when secured to the casing of each control device 5 by thumb screw 58 in the position shown in the drawing provides through the medium of links 51 the fulcrum about which the throttle control lever 43 normally operates in response to operation of the diaphragms 10 and 35.

It is possible on a water craft, that due to an accident such as failure of the supply of fluid pressure through pipe 70 or breakage of some part of a throttle control device 5, it might not be possible for such device to control the speed of the respective engine. Under such a condition, the thumb screw 58 may be backed out of the casing until the cylindrical portion 59 of the screw is turned out of the bore 57 and then the plate 55 may be manually moved in either one direction or the other to thereby cause movement of the lever 43 and arm 3 in a desired direction for either accelerating or slowing down the engine to the desired degree, following which the thumb screw 58 may be screwed into the casing and tightened against the plate 55 for holding same in the desired adjusted position.

In practice it may be found that a fuel supply device 2 may not act to accurately vary the fuel supply to an engine in accordance with the pressure of fluid provided in chamber 12, due for instance to uncontrollable variations in resistance to movement of certain of the parts in said device. In other words, a slight increase in pressure in chamber 12 may have no effect upon the adjustment of one fuel supply device 2 while another may be properly adjusted in response to such an increase, or one device may respond differently than another to a slight variation in fluid pressure in chamber 12. Any such failure of adjustment or possibly improper adjustment may, however, be corrected by operation of the proper manual control valve 67, as above described.

When the operator moves the handle 68 of the manual control valve 65 to the maximum pressure position indicated by line 69, it is, however, desirable that all of the fuel supply devices 2 be accurately adjusted by the respective pneumatic control devices 5 to provide for synchronous operation of the several engines at maximum output, regardless of variations in resistance to movement of any of the operating parts and without any subsequent adjustment of the manual control valves 67. To insure this result, the control devices 5 may be constructed as shown in Fig. 5.

According to this modification, I provide in bore 16 an adjustable stop 75 having screw-threaded engagement with the wall of said bore and extending into chamber 15 for engagement by the diaphragm follower 17. In the end of this stop projecting into bore 16 are a plurality of slots 76, and one or more openings 77 may be provided in the wall of the casing in line with said slots whereby a tool may be inserted through one or another of the openings into one of said slots and then operated to turn the stop in the casing.

The stop 75 is so adjusted as to be engaged by the follower 17 when the fuel control supply arm 3 attains the position indicated by line 4. With this arrangement the manual control valve 65 will provide in the position indicated by line 69 a pressure sufficiently in excess of that of spring 21 to insure contact between follower 17 and stop 75 against the opposing pressure of fluid which may be effective in chamber 37 on the vernier diaphragm 35 and to then hold these parts in this condition even though the pressure of fluid on the vernier diaphragm 35 should be varied. Thus, when the manual controller 65 is moved to the position indicated by line 69, all of the control devices 5 will operate simultaneously to move the fuel control arms 3 to the position indicated by line 4 to provide maximum output of all of the engines.

Summary

From the above description it will now be seen that I have provided a relatively simple control system particularly suitable for remotely controlling a plurality of devices such as Diesel engines and embodying a master controller for simultaneously adjusting the speed or output of all of said engines and an individual vernier controller for each engine for effecting, with a great degree of accuracy, slight changes in such adjustment as required to correct for any variable in the individual engine which interferes with or prevents the desired operation thereof.

The system embodies a control device for each engine for adjusting the speed or output of the engine in accordance with operation of the master controller and vernier controller. This control device embodies a control spring and is so constructed and arranged as to be capable of synchronizing operation of the several engines regardless of variations in operating characteristics of the control springs in the several control devices.

While only two embodiments and one use of the invention have been shown and described in detail, it is not the intention to limit the scope of the invention except by the terms of the appended claims.

Having now described my invention, what I claim as new and desire to secure by Letters Patent, is:

1. In combination, a plurality of adjustable control members, a plurality of adjusting means arranged one for each of said members and each comprising a control spring, a main movable abutment subject to the opposing pressures of said spring and of fluid in a chamber and movable by said spring to a certain position upon release of fluid under pressure from said chamber and movable against said spring upon supply of fluid under pressure to said chamber, a secondary movable abutment connected to said primary abutment and operative upon a variation in fluid pressure on one face to provide a force which cooperates with said spring to determine the position of said primary abutment when subject to pressure of fluid in said chamber, a main control valve operable manually to supply fluid under pressure to said chamber in all of said adjusting means simultaneously for effecting movement of said primary abutment in all of said adjusting means in unison, a secondary control valve for one of said adjusting means operative manually to effect a variation in pressure on the respective secondary abutment, and means operable by said abutments in each adjusting means to position the respective control member in accordance with the pressure of fluid acting on both abutments.

2. In combination, a plurality of devices each comprising a control spring, a movable abutment subject to the opposing pressures of said spring and of fluid in a chamber, said spring being operative with said chamber vented to move said abutment to a certain position and said abutment being operative upon supply of fluid under pressure to said chamber to move said abutment out of said certain position to a position depending upon the pressure of fluid supplied to said chamber, a control valve operative to supply fluid under pressure to and release fluid under pressure from said chamber in the plurality of devices simultaneously, means in each of said devices operative to adjust the pressure of said spring on said abutment to provide synchronous movement of said abutments in response to operation of said control valve, a lever having a fulcrum and spaced therefrom a connection with said abutment and also having an operating connection for a device to be operated, said operating connection having a fixed degree of travel, and means for adjusting the fulcrum for said lever to position the lever operating connection at one extreme of said travel when said chamber is vented and at the opposite extreme of said travel when said chamber is supplied with fluid at a chosen degree of pressure.

3. In combination, a pneumatic control device comprising a casing, a lever having a fulcrum connection with said casing, a spring in said casing, a movable abutment in said casing having a connection with said lever and subject on one face to the pressure of said spring and on the opposite face to variations in fluid pressure, another movable abutment in said casing having a connection with said lever and subject on one face to variations in fluid pressure, said abutments cooperating with said spring to rock said lever about said fulcrum connection to a position determined by the pressure of fluid on both of said abutments, individually manually operable means for varying the pressure of fluid on said abutments, and a member to be operated by said lever having an operating connection therewith.

4. In combination, a pneumatic control device comprising a casing, a lever having at one end a fulcrum connection with said casing; a movable abutment in said casing having at one side a fluid pressure control chamber, a member projecting from the opposite side of said abutment through an opening in said casing and connected to said lever, and adjusting nut having screw-threaded engagement with the wall of said opening, a coil spring supported on said nut and adjusted thereby to bear against said opposite side of said abutment, said abutment being movable in one direction against said spring upon supply of fluid under pressure to said chamber to adjust said lever in accordance with the pressure of such fluid, said spring being operative to move said abutment in the opposite direction upon release of fluid under pressure from said chamber, an adjustable stop having screw-threaded engagement with the wall of said opening and arranged to be engaged by said abutment upon supply of fluid at a certain pressure to said chamber to limit movement of said abutment and lever by fluid pressure, and means in the connection between said lever and casing operative to adjust the arm of said lever between said casing and the connection with said member.

5. In combination, a pneumatic control device comprising a casing, a lever having at one end a fulcrum connection with said casing; a movable abutment in said casing having at one side a fluid pressure control chamber, a member projecting from the opposite side of said abutment through an opening in said casing and connected to said lever, an adjusting nut having screw-threaded engagement with the wall of said opening, a coil spring supported on said nut and adjusted thereby to bear against said opposite side of said abutment, said abutment being movable in one direction against said spring upon supply of fluid under pressure to said chamber to adjust said lever in accordance with the pressure of such fluid, said spring being operative to move said abutment in the opposite direction upon release of fluid under pressure from said chamber, another movable abutment in said casing of smaller area than the first named abutment, a lever connecting said other abutment to the first named abutment whereby pressure of fluid in a chamber acting on said other abutment opposes pressure of fluid on the first named abutment, an adjustable stop having screw-threaded engagement with the wall of said opening and arranged to be engaged by the first named abutment upon supply of fluid at a certain pressure to the first named chamber to limit movement of said abutment and lever by fluid pressure, and a control valve operative to supply fluid to the first named chamber to act on the first named abutment at a pressure to hold said first named abutment in contact with said stop against pressure of fluid acting on the second named abutment.

6. In a control apparatus, a plurality of movable control elements, means operative to effect simultaneous movement of all of said control elements, another and separately operable means operative to effect individual movement of one of said control elements relative to movement effected in response to operation of the first named means to obtain the same movement of all of said elements, and means operative upon a certain operation of the first mentioned means to provide like movements of all of said elements and to render the second mentioned means ineffective to effect movement of the respective element.

7. In a control apparatus, a plurality of movable control elements, means operative to effect simultaneous movement of all of said control elements, another and separately operable means operative to effect individual movement of one of said control elements relative to movement effected in response to operation of the first named means, and adjustable means for limiting movement of all of said elements to a chosen maximum degree, the first mentioned means being operative to effect said maximum degree of movement of all of said elements simultaneously and to render the second mentioned means ineffective to effect movement of the respective element.

8. In combination, two individual regulating devices each comprising a movable abutment adjustable in accordance with variations in pressure of fluid in a control chamber, a manually operative control device, conduit means connecting said control device to the control chambers of both of said regulating devices, said control device being operable to effect, through said conduit means, variations in pressure of fluid in both of said control chambers simultaneously, one of said regulating devices comprising a second movable abutment subject to pressure of fluid in a second chamber which is separate from the control chamber, mechanism rendering said second movable abutment cooperative with the first named movable abutment in said one regulating device to adjust said one regulating device in accordance with the pressure of fluid on both of said abutments in said one regulating device, another manually operative control device separate from and non-controllable by the first named manually operative control device, and conduit means connecting said second chamber to said other manually operative control device, said other manually operative control device being operable to vary through the last named conduit means the pressure of fluid in said second chamber.

ROY R. STEVENS.